United States Patent [19]
Chen

[11] Patent Number: 5,894,997
[45] Date of Patent: Apr. 20, 1999

[54] MACHINE FOR SHREDDING A DISCARDED TIRE

[76] Inventor: ping lu Chen, No. 180-9, Dingli Road, Shianshi Shiang, Janghuah County, Taiwan

[21] Appl. No.: 08/967,335

[22] Filed: Oct. 21, 1997

[51] Int. Cl.[6] ..................................................... B02C 7/14
[52] U.S. Cl. .................. 241/34; 241/277; 241/DIG. 31
[58] Field of Search .............................. 241/DIG. 31, 34, 241/277, 280, 282

[56] References Cited

U.S. PATENT DOCUMENTS

| 4,216,916 | 8/1980 | Tupper | 241/DIG. 31 X |
| 4,682,522 | 7/1987 | Barcaly | 83/19 |
| 4,776,249 | 10/1988 | Barclay | 241/DIG. 31 X |
| 5,482,215 | 1/1996 | Veres | 241/DIG. 31 X |
| 5,551,325 | 9/1996 | Schutt | 241/DIG. 31 X |
| 5,580,010 | 12/1996 | Barclay et al. | 241/236 |
| 5,590,838 | 1/1997 | Brewer | 241/23 |

Primary Examiner—Joseph J. Hail, III
Assistant Examiner—William Hong
Attorney, Agent, or Firm—Pro-Techtor International Services

[57] ABSTRACT

A machine for shredding a discarded tire is composed of a base, a vertical advancing seat, a horizontal advancing seat, a tire holding device, a transmission device, a tool set, and a computer control device. The vertical advancing seat is provided with a slide block capable of sliding along the vertical advancing seat in the vertical direction relative to the base. The horizontal advancing seat is mounted on the slide block of the vertical advancing seat and is provided with a slide block capable of sliding along the horizontal advancing seat in the horizontal direction relative to the base. The horizontal advancing seat is further provided with two sensors, whereas the slide block of the horizontal advancing seat is provided with two sensing blocks capable of cooperating with the sensors to execute the step-by-step shredding operation is conjunction with the tool set and the computer control device.

9 Claims, 9 Drawing Sheets

MACHINE FOR SHREDDING A DISCARDED TIRE

FIELD OF THE INVENTION

The present invention relates generally to a shredding machine, and more particularly to a machine for shredding a discarded tire so as to facilitate the recycling of the discarded tire.

BACKGROUND OF THE INVENTION

The discarded tire is a serious environmental problem in view of the fact that the discarded tire can not be easily disposed of, and that the discarded tire is one of the sources responsible for the environmental pollution. The practical and workable solution to environmental problem caused by the discarded tire is to recycle the discarded tire. However, before the discarded tire is recycled, it must be shredded in a specific manner to conform with the recycling requirements. The conventional shredding machines are not specifically intended for shredding the discarded solid tire for the recycling purpose. For this reason, there is indeed a need for developing a machine for shredding the discarded solid tire for the recycling purpose.

SUMMARY OF THE INVENTION

The primary objective of the present invention is therefore to provide a machine which is specifically designed to shred the discarded solid tire in such a manner that the discarded tire can be recycled. The shredding machine of the present invention comprises a base, a first advancing seat, a second advancing seat, a tire holding device, a transmission device, a tool set, and a computer-aided control device. The first advancing seat is provided with a slide block capable of sliding along the first advancing seat in a direction perpendicular the front surface of the base, whereas the horizontal advancing seat is mounted on the slide block of the first advancing seat and is provided with a slide block capable of sliding along the second advancing seat in a direction parallel to the front surface of the base. The second advancing seat is further provided with two sensors, whereas the slide block of the second advancing seat is provided with two sensing blocks capable of cooperating with the sensors to execute the shredding operation is conjunction with the tool set and the computer control device. The sensing blocks of the slide block of the second advancing seat can be adjusted in position according to the tread size of a tire to be shredded. The tool set is provided with a metal sensor capable of transmitting a "STOP" signal to the computer control device at the time when the shredding tool in motion approaches the steel wires contained in a steel-belted tire being shredded.

DETAILED DESCRIPTION OF THE EMBODIMENT

Figure 1:
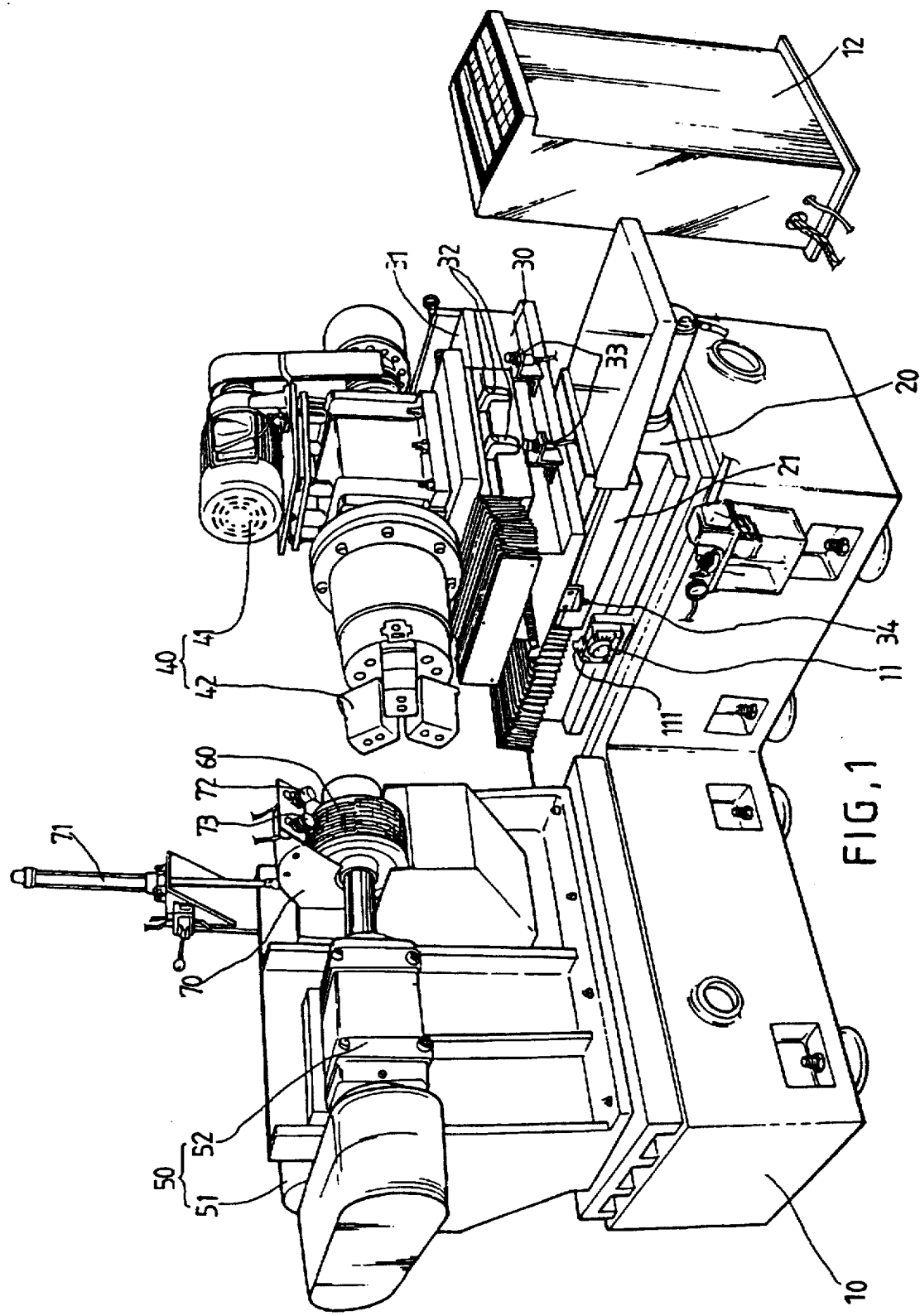
FIG. 1 shows a perspective view of the embodiment of the present invention.
Figure 2:
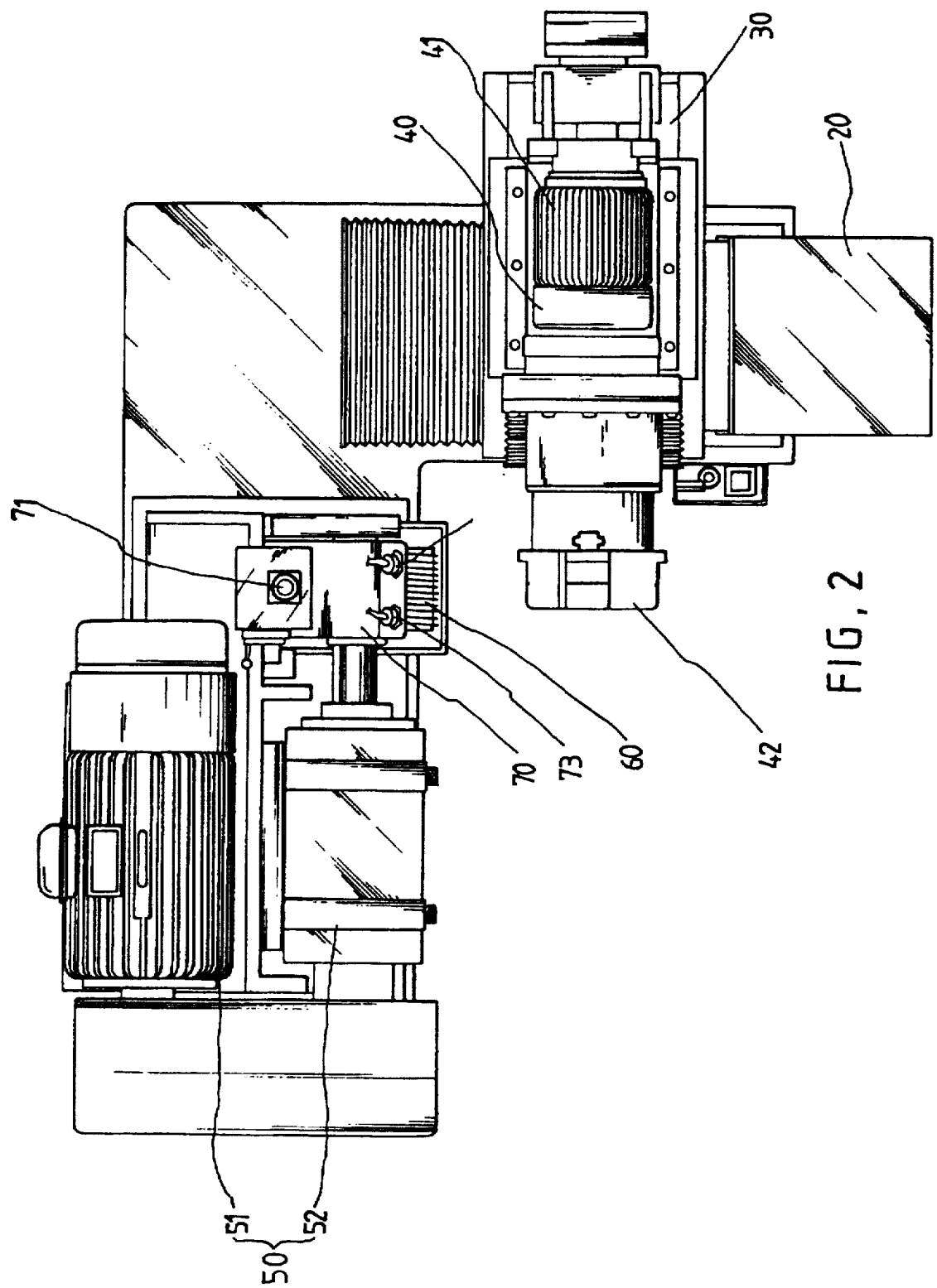
FIG. 2 shows a top view of the embodiment of the present invention.
Figure 3:
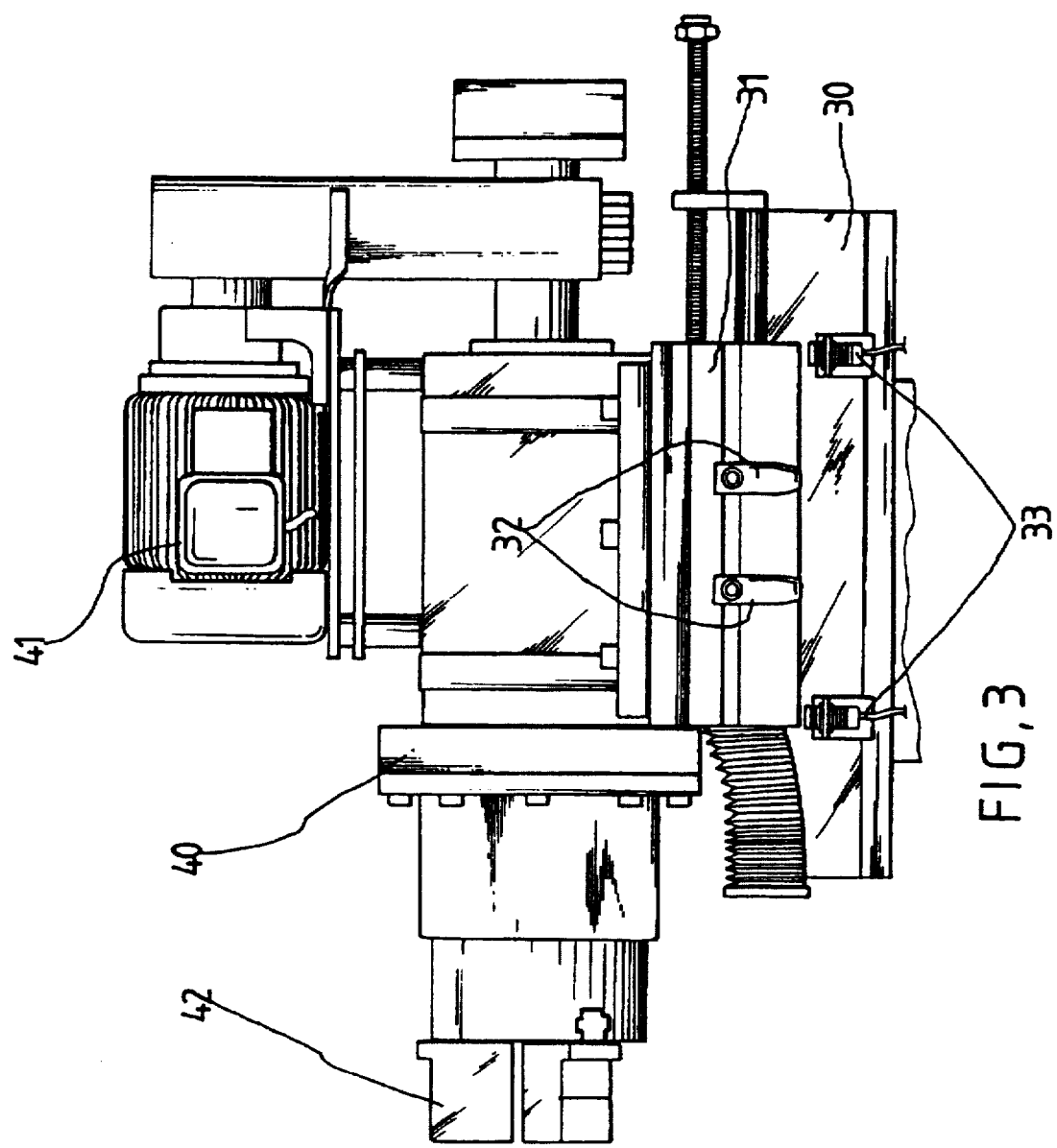
FIG. 3 shows a side schematic plan view of the longitudinal tool advancing seat of the embodiment of the present invention.
Figure 4:
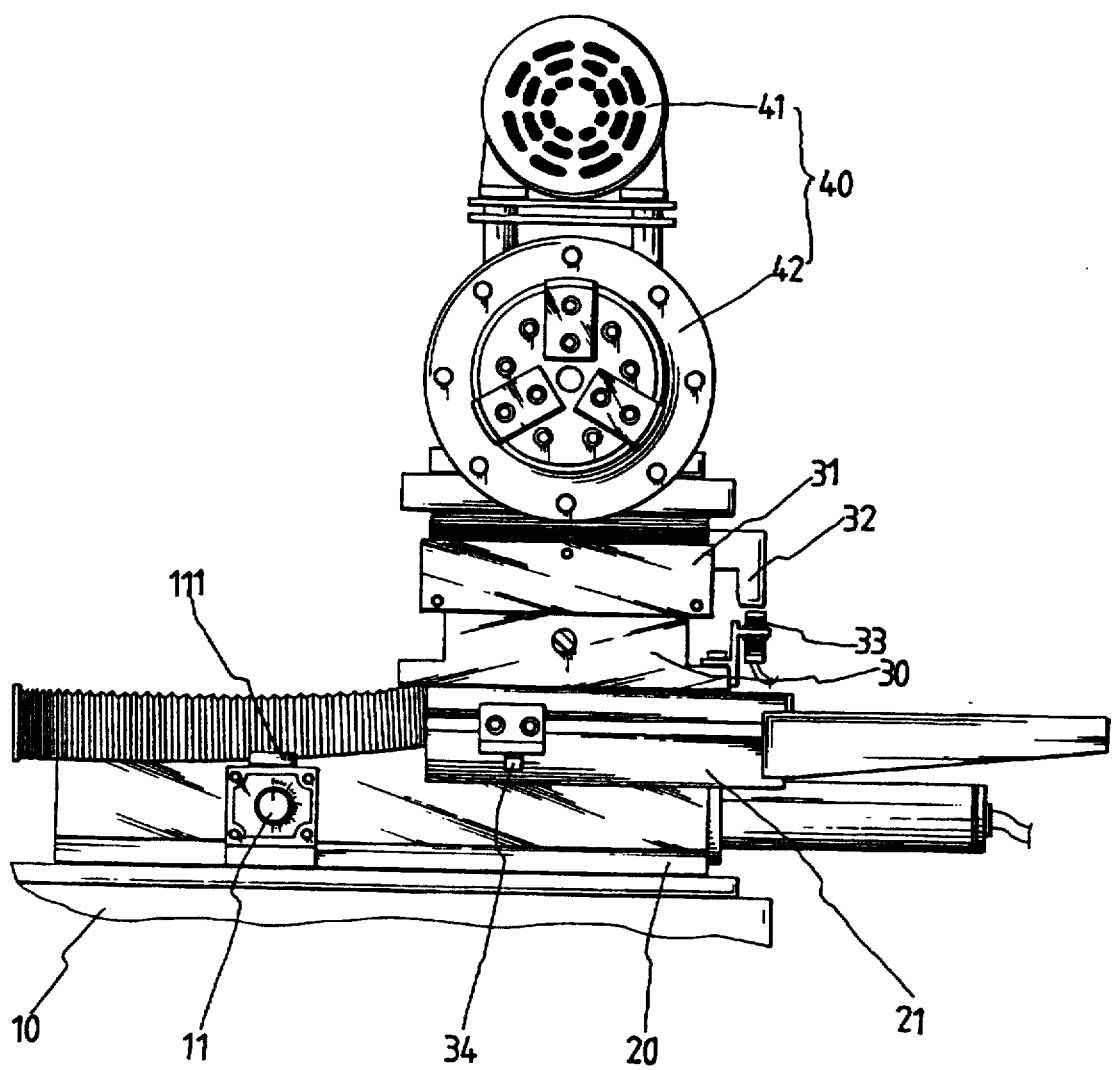
FIG. 4 shows a side schematic plan view of the transverse tool advancing seat of the embodiment of the present invention.
Figure 5:
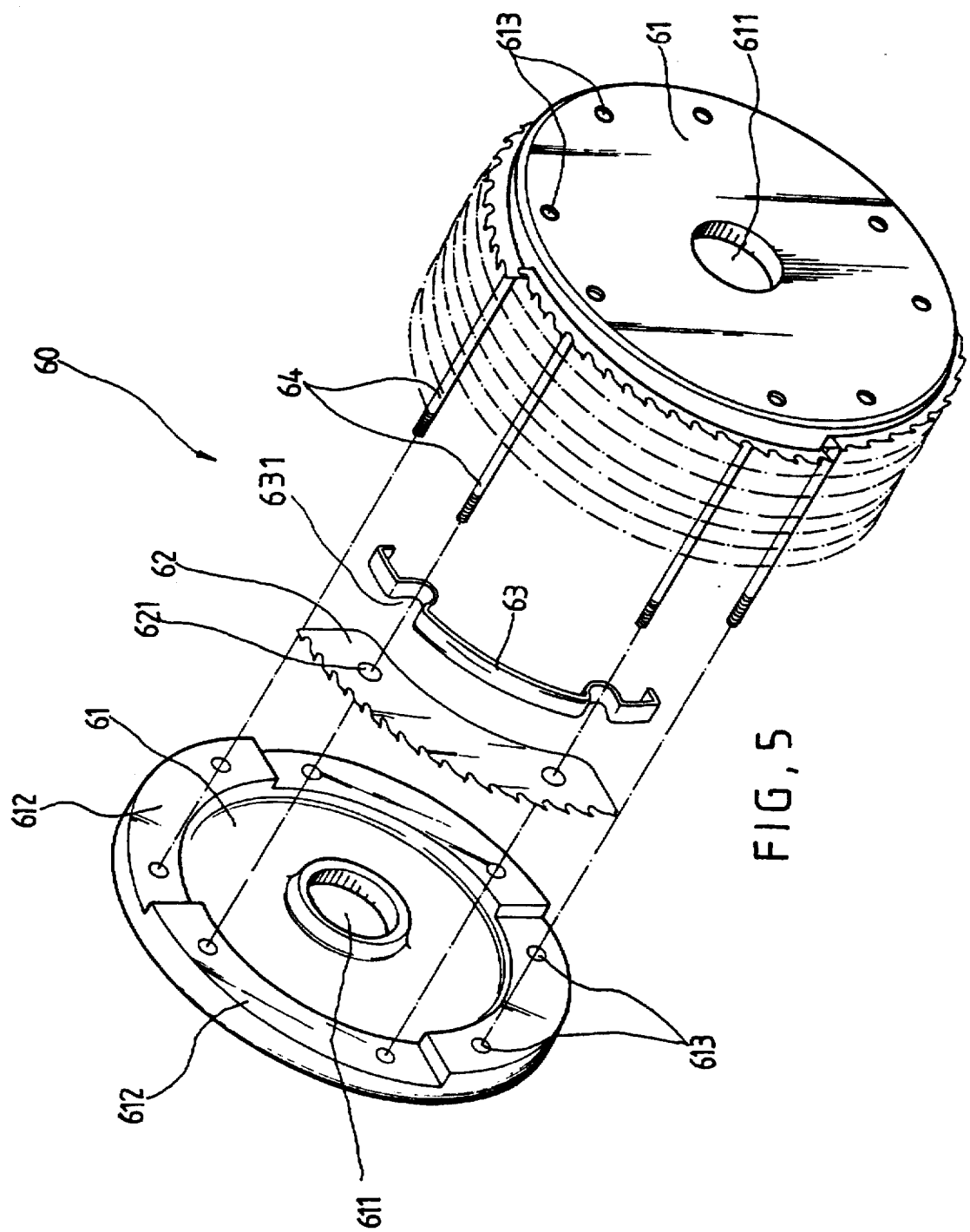
FIG. 5 shows an exploded view of the tool set of the embodiment of the present invention.
Figure 6:
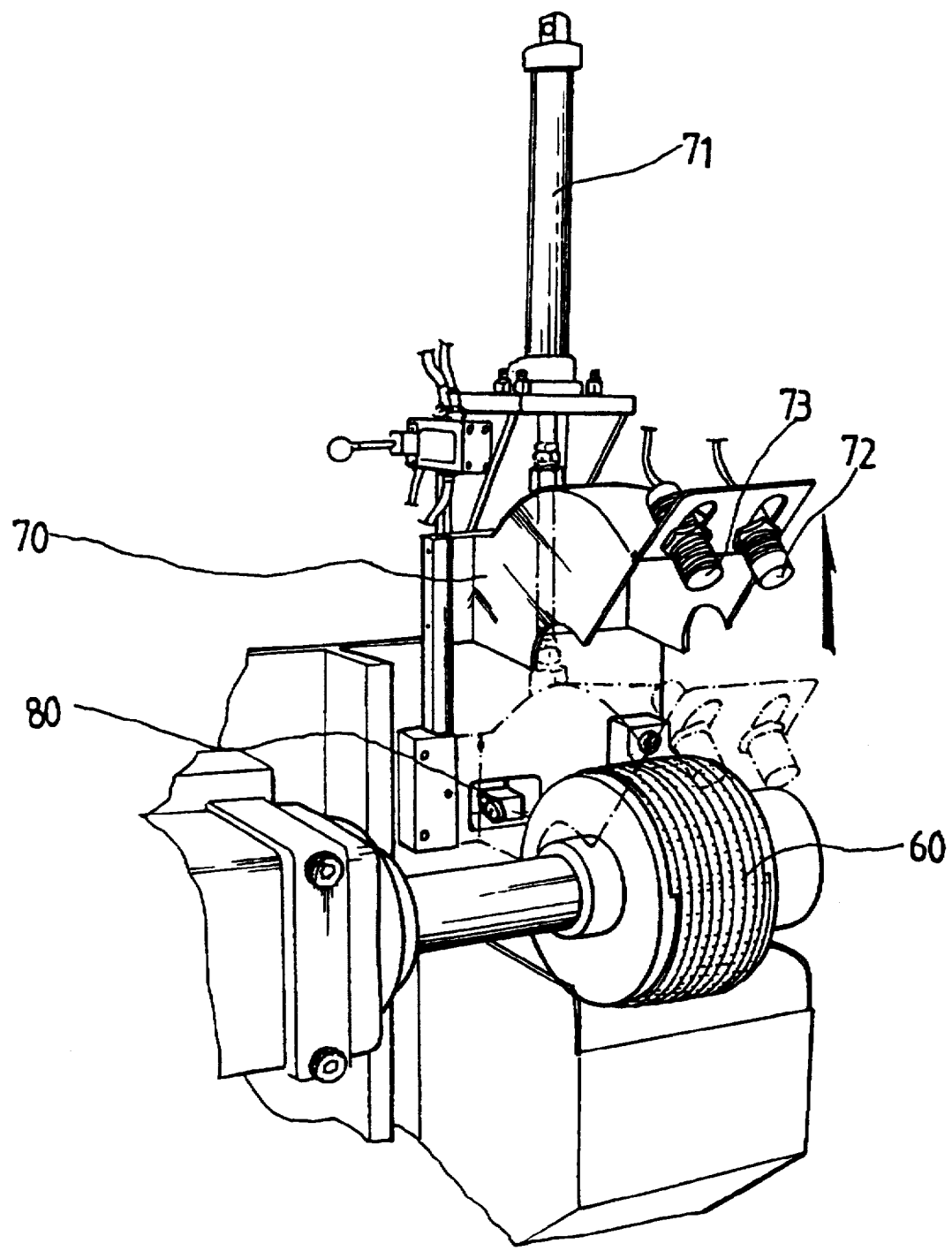
FIG. 6 shows a partial perspective view of the embodiment of the present invention.

As shown in FIGS. 1–6, a machine embodied in the present invention is intended for shredding a discarded solid tire and is mainly composed of a base 10, a first advancing seat 20, a second advancing seat 30, a tire holding device 40, a transmission device 50, a tool set 60, and a computer control device PLC 12.

The base 10 is an L-Shaped construction and is composed of two portions perpendicular to each other. The first advancing seat 20, the second advancing seat 30, and the tire holding device 40 are mounted on one portion of the L-Shaped base 10, whereas the transmission device 50 and the tool set 60 are mounted on another portion of the L-Shaped base 10. The computer control device PLC 12 stands alone by the machine of the present invention. A contact switch 11 is mounted on the base 10 such that the contact switch 11 is opposite in location to the first advancing seat 20. The contact switch 11 is provided with a circular dialing block 111 having an indentation. The dialing block 111 serves as an action element of the contact switch 11. The machine of the present invention is operated in conjunction with the computer control device PLC 12 capable of regulating the operation of the component parts of the shredding machine of the present invention.

The first advancing seat 20 is provided with a slide block 21 mounted thereon such that the slide block 21 is capable of a sliding motion along the first advancing seat 20 in a direction perpendicular to a front surface of the base 10. The horizontal advancing seat 30 is mounted on the slide block 21 and is provided with a slide block 31 capable of sliding along the second advancing seat 30 in a direction parallel to the front surface of the base 10. The slide block 31 is provided with two sensing blocks 32. The second advancing seat 30 is provided with two sensors 33 and an arresting block 34. The arresting block 34 is capable of actuating the dialing block 111 of the contact switch 11. The tire holding device 40 is mounted on the slide block 31 of the second advancing seat 30 and is composed of a transmission portion 41 and a clamping portion 42 capable of being actuated by the transmission portion 41 which is in turn driven by a motor (not shown in the drawing).

The transmission device 50 consists of a motor 51 and a main spindle 52 for driving the tool set 60, which is composed of a plurality of tool plates 61, blades 62 and partition members 63. The tool plates 61 are provided at the center thereof with an axial hole 611 and at one end thereof with a plurality of open slots 612 different from one another in inclination head. Each of the open slots 612 is provided with two through holes 613 extending through the tool plate 61. The blades 62 are arcuate in shape and is provided in the outer arcuate surface thereof with teeth. The body of the blades 62 is provided with two through holes 621 opposite in location to the through holes 613 of the open slots 612. The partition members 63 are arcuate in shape and has two U-Shaped recesses 631 corresponding in location to the through hole 621 of the blade 62. The fastening rods 64 are received in the through holes 613 of the tool plates 61 and the blades 62 such that the rods 64 are located in the U-Shaped recesses 631 of the partition members 63. The main spindle of the transmission device 50 is received in the axial hole 611 of the tool plate 61. The partition members 63 serve to separate the blades 62.

The base 10 is further provided with a protective cover 70 corresponding in location to the tool set 60 and capable of moving up and down by means of a pull rod 71 for covering the tool set 60. The protective cover 70 is provided with capacitance 72 and a metal sensor 73. The base 10 is still further provided with a power switch 80 corresponding in location to the protective cover 70. When the machine is in operation, the switch 80 is pressed by the protective cover 70 such that power is made available to the machine. As the pull rod 71 is lifted, the protective cover 70 is disengaged with the switch 80 such that the power supply is interruption and that the machine in operation is thus stopped, so as to safeguard the operator of the shredding machine.

Figure 7:
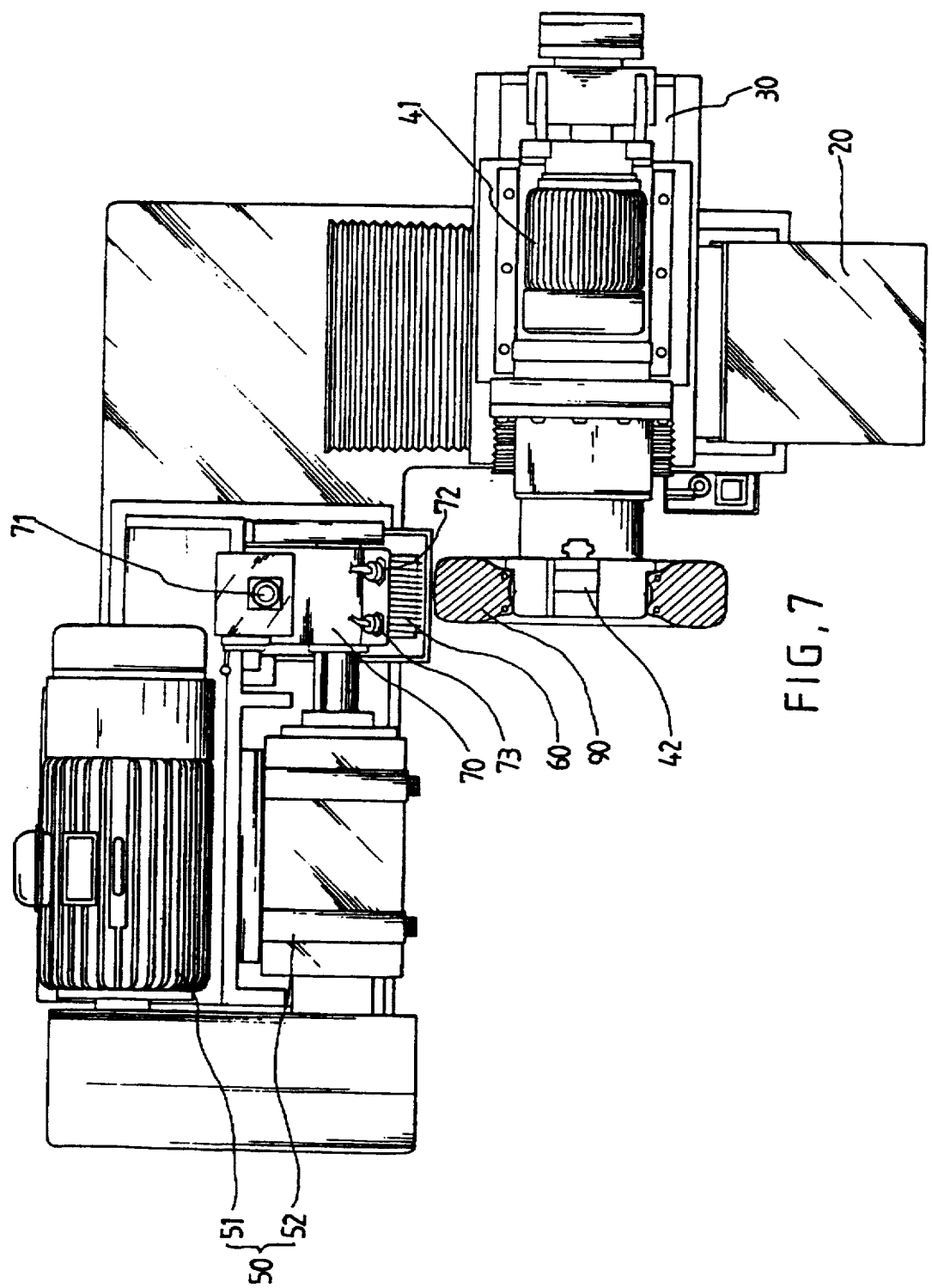
FIG. 7 shows a schematic view of the embodiment of the present invention at work.
Figure 8:
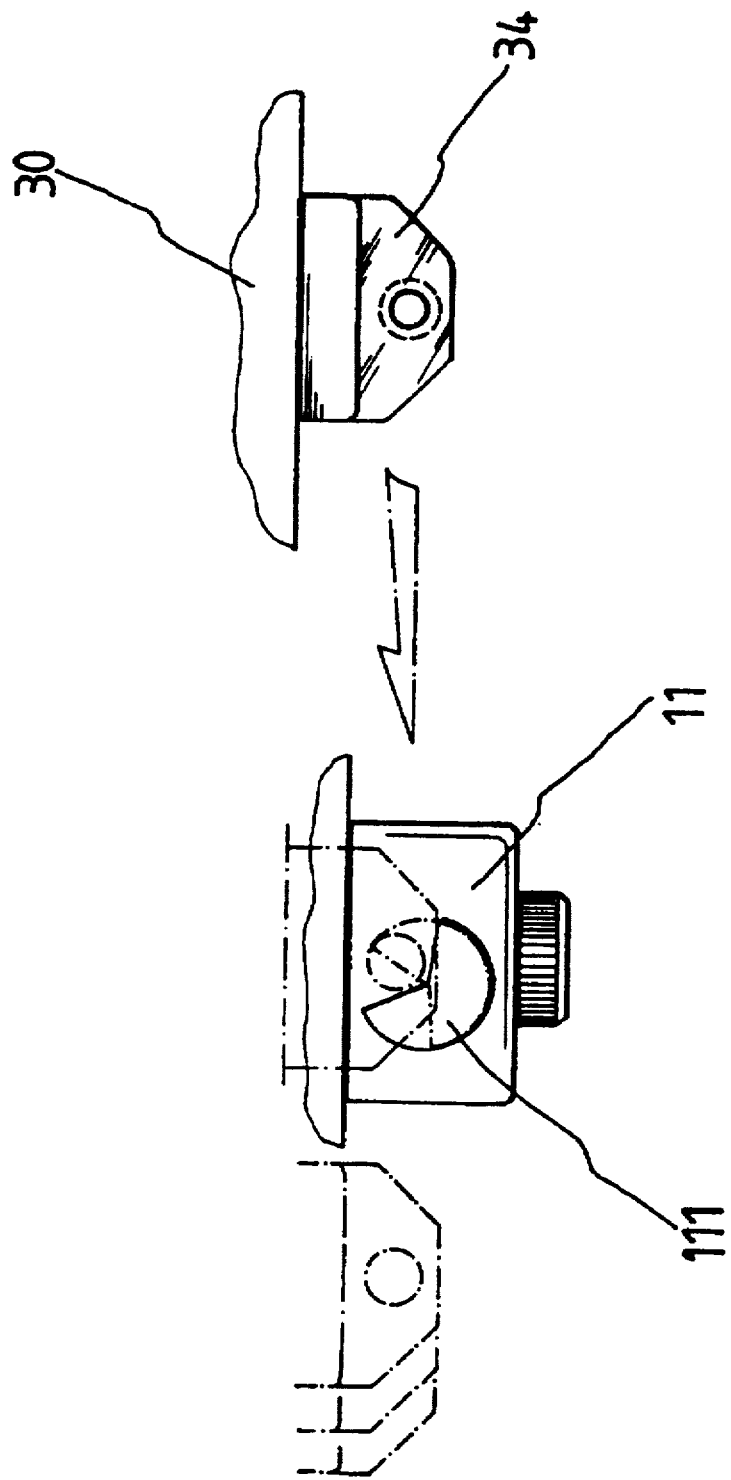
FIG. 8 shows a top view of a contact switch of the present invention at work.
Figure 9:
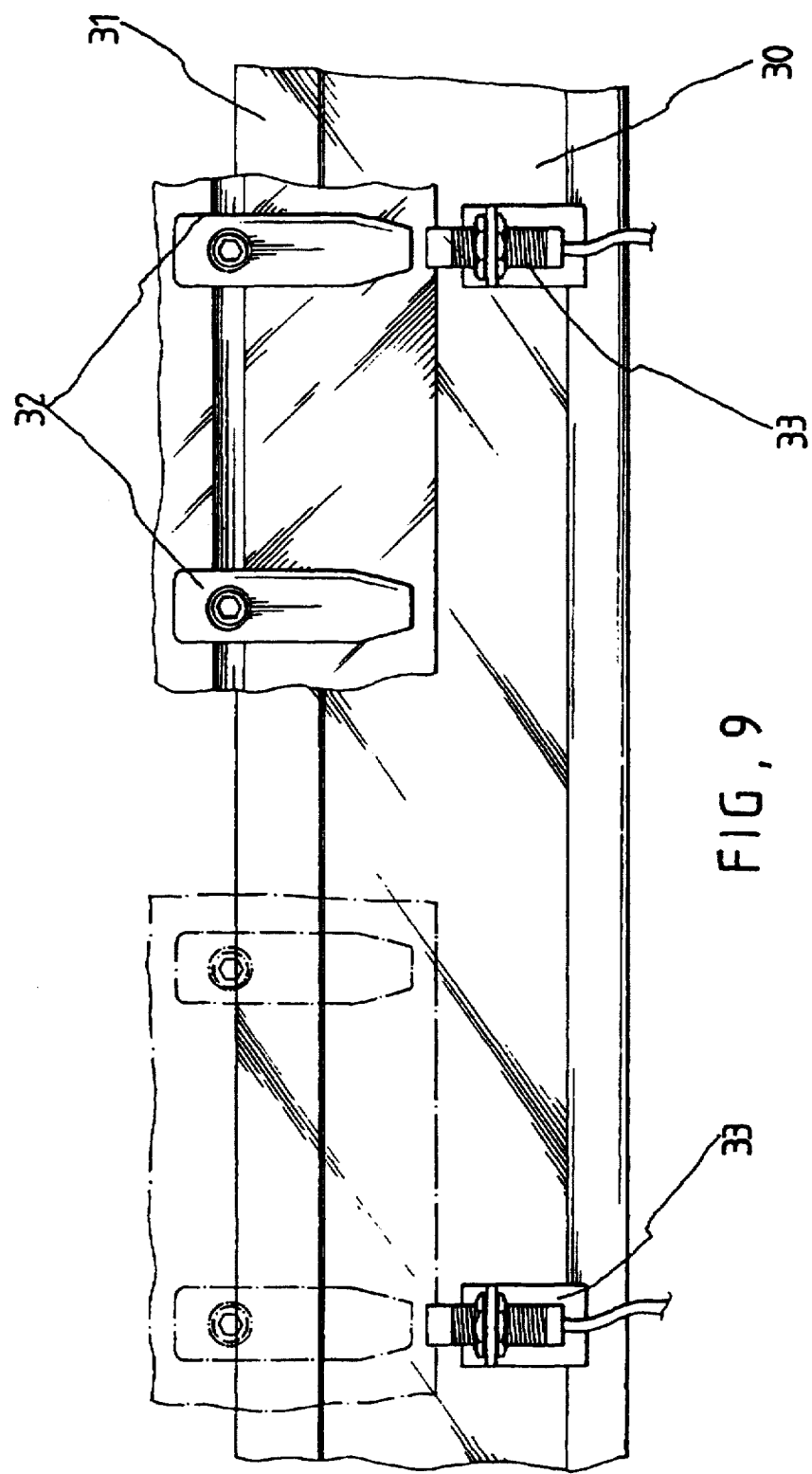
FIG. 9 shows a schematic view of the metal sensor of the present invention at work.

As shown in FIGS. 7–9, a discarded solid tire 90 is held securely by the tiore holding device 40 before the computer control device PLC 12 is started. As soon as the computer control device PLC 12 is start, the slide block 21 of the first advancing seat 20 begins to displace vertically to actuate the second advancing seat 30 to move towards the tool set 60, thereby resulting in the arresting block 34 of the second advancing seat 30 to actuate the dialing block 111 of the contact switch 11 of the base 10. As soon as the contact switch 11 is triggered at such time when the second advancing seat 30 moves rapidly towards the tool set 60, an instructional signal is sent to the computer control device PLC 12 such that the first tool advancing seat 20 in motion is caused to decelerate, thereby lessening the speed at which the second advancing seat 30 moves toward the tool set 60. When the discarded solid tire 90 is carried by the tire holding device 40 to approach the tool set 60, the position of the discarded solid tire 90 is sensed by the capacitance 72 of the protective cover 70. As a result, the computer control device PLC 12 is alerted to halt the slide block 21 in motion, so as to determine the precise position of the discarded solid tire 90. The sliding speed of the slide block 21 of the first advancing seat 20 is controlled by the computer control device PLC 12 such that the discarded solid tire 90 is prevented from colliding with the tool set 60.

As the discarded solid tire 90 is precisely located, the slide block 31 of the second advancing seat 30 is directed by the computer control device PLC 12 to move in a specific direction. In the meantime, the position of two sensing blocks 32 of the slide block 31 are adjusted in accordance with the width of the discarded solid tire 90. When the slide block 31 continues to move until such time when one of the two sensing blocks 32 is opposite in location to one of sensing 33 of the second advancing seat 30, the slide block 31 in motion is brought to a halt by the computer control device PLC 12. In the meantime, the slide block 21 of the first advancing seat 20 is instructed by the computer control device PLC 12 to advance a distance, such as 3 mm, the slide block 31 is actuated to move in the horizontal leftward direction to enable the discarded solid tire 90 to be shredded by the blades 62 of the tool set 60. Upon completion of the first shredding operation, the slide block 31 continues its horizontal displacement until such time when another sensing block 32 is opposite in location to another sensor 33 of the second advancing seat 30. Thereafter, the slide block 31 in motion is brought to a halt by the computer control device PLC 12. The slide block 21 of the first tool advancing seat 20 is once again actuated to advance a specific shredding distance, such as 3 mm, whereas the slide block 31 is actuated to move in the second rightward direction along the horizontal advancing seat 30 to enable the discarded solid tire 90 to be shredded for the second time until the steel contained in the discarded solid tire 90 is exposed. As soon as the steel of the solid tire 90 is exposed, a sensing signal is transmitted by the metal sensor 72 to the computer control device PLC 12, so as to terminate the shredding operation of the discarded solid tire 90. In the meantime, the first tool advancing seat 20 is returned to its initial position, whereas the dialing block 111 of the contact switch 11 is actuated by the arresting block 34 to return to its initial position.

The tool set 60 of the present invention is capable of increasing the shredding area of the discarded solid tire 90 in view of the fact that the open slots 612 of the tool plates 61 are designed to have an inclination head so as to enable the blades 62 to shred the solid tire 90 at an inclination. In addition, any one of the blades 62 of the tool set 60 of the present invention can be replaced with a new one for any reason, without having to replace the tool set 60 in its entirety. Moreover, the sensing blocks 32 of the slide block 31 of the second tool advancing seat 30 can be adjusted in accordance with the size of the tread of the discarded solid tire 90, thereby enabling the sensing block 32 to be opposite in location to the sensor 33 so as to control the distance of the sliding path of the slide block 31 of the second advancing seat 30 for controlling the shredding area of the discarded solid tire 90 by the tool set 60.

The step-by-step shredding operation of the present invention is brought about by the first tool advancing seat 20 and the second advancing seat 30, which are controlled by the computer control device PLC 12. In other words, the shredding machine of the present invention can be also used to shred a discarded hollow tire. The tread and the sidewall of a discarded pneumatic tire can be effectively shredded by the machine of the present invention.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A machine for shredding a discarded tire, said machine comprising:

a base including a contact switch;

a first advancing seat mounted on said base and provided with a slide block capable of sliding along said first advancing seat in a first direction;

a second advancing seat mounted on said slide block of said first advancing seat and provided with a slide block capable of sliding along said second advancing seat in a second direction orthogonal to said first direction, said second advancing seat is further provided with two sensors, said slide block of said second advancing seat having two sensing blocks capable of moving along with said slide block of said second advancing seat to align with one of said two sensors of said second advancing seat;

a tire holding device mounted on said slide block of said second advancing seat and provided with a motor, a transmission portion driven by said motor, and a clamping portion actuated by said transmission portion to hold a tire to be shredded;

a transmission device mounted on said base and comprising a motor and a spindle driven by said motor;

a tool set mounted on said base such that said tool set is contiguous to said tire holding device, said tool set comprising a plurality of blades for shredding the tire held by said tire holding device, partition members for separating said blades, and tool plates each having an axial hole for receiving said spindle of said motor of said transmission device; and a computer control device for controlling operation of said machine; wherein a first shredding operation of the tire is actuated by said computer control device causing said slide block of said first advancing seat to displace thereby causing said second advancing seat to move towards said tool set, thereby resulting in said contact switch of said base being triggered such that a signal is transmitted to said computer control device to control a sliding speed of said slide block of said first advancing seat and to regulate motion of said slide block of said second advancing seat in such a way that said slide block of said second advancing seat is halted at such time as one of said two sensing blocks of said slide block of said second advancing seat is aligned with one of said two sensors of said second advancing seat, said slide block of said first advancing seat being instructed by said computer control device to advance a distance so as to actuate said slide block of said second advancing seat to enable the tire held by said tire holding device to be shredded by said blades of said tool set; and a second shredding operation of the tire being brought about upon completion of the first shredding operation in such a manner that said slide block of said second advancing seat continues to move until such time when another one of said two sensing blocks is aligned with another one of said two sensors, thereby resulting in the ending of the second shredding operation and the beginning of another first shredding operation.

2. The machine as defined in claim 1, wherein said base has an L-shape such that said two portions of said base are perpendicular to each other.

3. The machine as defined in claim 1, wherein said contact switch of said base has a dialing block; wherein said horizontal advancing seat is provided with an arresting block capable of actuating said dialing block of said contact switch of said base.

4. The machine as defined in claim 1, wherein said tool set is provided with a metal sensor capable of transmitting a signal to halt the operation of said computer control device at such time when said metal sensor senses the steel wires of a steel-belted tire being shredded by said tool set.

5. The machine as defined in claim 1, wherein said two sensing blocks of said slide block of said horizontal advancing seat can be adjusted in position according to the tread size of a discarded tire to be shredded. tread size of a discarded tire to be shredded.

6. The machine as defined in claim 1, wherein said tool plates of said tool set are provided with a plurality of open slots having an inclination head enabling said blades to shred the tire at an inclination.

7. The machine as defined in claim 1, wherein said tool plates are provided with at least two through holes; wherein said blades are provided with at least two through holes corresponding in location to said through holes of said tool plates; wherein said partition members are provided with two recesses corresponding in location to said through holes of said tool plates and said blades; and wherein said tool plates, said blades and said partition members are fastened together by at least two fastening rods received in said through holes of said tool plates and said blades, and said recesses of said partition members.

8. The machine as defined in claim 7, wherein said recesses of said partition members are of a U-shaped construction.

9. The machine as defined in claim 1, wherein said base in further provided with a protective cover capable of being moved up and down along a pull rod to cover said tool set; and wherein said base is still further provided with a power switch capable of interrupting the power supply of said machine at such time when said protective cover is lifted along said pull rod to cause said protective cover to become disengaged with said power switch.

* * * * *